United States Patent
Sim (10) Patent No.: US 7,109,890 B2
(45) Date of Patent: Sep. 19, 2006

(54) KEYBOARD WITH DIGITAL AUDIO

(75) Inventor: Wong Hoo Sim, Singapore (SG)

(73) Assignee: Creative Technology Ltd., Singapore (SG)

( * ) Notice: Subject to any disclaimer, the term of this patent is extended or adjusted under 35 U.S.C. 154(b) by 423 days.

(21) Appl. No.: 10/444,531

(22) Filed: May 23, 2003

(65) Prior Publication Data

US 2004/0233073 A1    Nov. 25, 2004

(51) Int. Cl.
*G09G 51/00* (2006.01)
(52) U.S. Cl. .................. 341/20; 345/168; 345/156
(58) Field of Classification Search ............... 341/20, 341/22, 26; 345/168, 172, 156; 361/679
See application file for complete search history.

(56) References Cited

U.S. PATENT DOCUMENTS

| | | | | |
|---|---|---|---|---|
| 5,375,165 A | * | 12/1994 | Haber et al. | 379/110.01 |
| 5,717,430 A | | 2/1998 | Copland et al. | |
| 5,841,424 A | * | 11/1998 | Kikinis | 345/168 |
| 5,865,546 A | * | 2/1999 | Ganthier et al. | 400/489 |
| 5,892,503 A | | 4/1999 | Kim | |
| 5,987,586 A | * | 11/1999 | Byers | 712/11 |
| 6,268,806 B1 | | 7/2001 | Frager et al. | |
| 6,484,019 B1 | * | 11/2002 | Aklian | 455/344 |
| 6,545,668 B1 | * | 4/2003 | Hayama | 345/172 |
| 6,727,890 B1 | * | 4/2004 | Andres et al. | 345/168 |
| 6,842,168 B1 | * | 1/2005 | Sim et al. | 345/156 |
| 6,935,797 B1 | * | 8/2005 | Sim | 400/472 |

FOREIGN PATENT DOCUMENTS

| | | |
|---|---|---|
| EP | 1164462 | 12/2001 |
| GB | 2 288 368 A | 10/1995 |
| WO | WO 92/03884 | 3/1992 |
| WO | WO 2004/049106 | 6/2004 |

\* cited by examiner

*Primary Examiner*—Albert K. Wong
(74) *Attorney, Agent, or Firm*—Blakely, Sokoloff, Taylor & Zafman; Stephen M. De Klerk (57) ABSTRACT

An alphanumeric keyboard for use with a host computer is disclosed the alphanumeric keyboard has a plurality of alphanumeric keys; and a sound reproducing system. The sound reproducing system includes a data processor for controlling operating functions of the sound reproducing system; and an audio processor for receiving at least one of a plurality of audio input and providing at least one analog audio output. There is also a keyboard controller for sensing use of one or more of the plurality of alphanumeric keys and passing of keyboard scan code to the host computer. The keyboard controller further enables the use of predetermined keys of the plurality of alphanumeric keys for providing user input to the control of the operating function. A connection to the host computer provides a first of a plurality of digital audio inputs; a multi-channel digital audio input/output connection provides a second of the plurality of digital audio inputs; and a MIDI input/output connection provides digital data to be converted to digital audio to provide a third of the plurality of digital audio inputs.

34 Claims, 5 Drawing Sheets

KEYBOARD WITH DIGITAL AUDIO

FIELD OF THE INVENTION

This invention relates to a keyboard with digital audio and refers particularly though not exclusively, to an alphanumeric computer keyboard having digital audio processing functionality within and integrated with the keyboard.

DEFINITIONS

Throughout this specification reference to "alphanumeric" is to be taken as including any symbols that may be found on the keys of a computer keyboard including regional or national alphabets, scripts and symbols. For example, a so-called "western" keyboard may include the following alphanumeric keys:
  alpha keys a to z;
  numeric keys 0 to 9;
  function keys including dedicated function keys such as, for example, F1 to F12, and such keys as Internet access keys;
  instructional keys such as, for example, "Esc", "Enter", "Ctl", "Shift", "Tab", "Caps Lock", "Delete", "Insert", "Home", "Page Up", "Page Down", "End", "Num Lock";
  cursor control keys;
  and the "Shift" function of all of them.

BACKGROUND OF THE INVENTION

Most computers sold now have numerous connection ports for peripherals such as, for example, loud speakers, a keyboard, a mouse, one or two printers, external disk drivers, MP3 recorders/players, and so forth. The majority of the connectors are on the rear panel of the processor cover. This makes access difficult.

There have been many proposals for "multi-media" keyboards whereby the alphanumeric keyboard for a computer has built in speakers. In the majority of cases, the signal supply to the keyboard is output from the sound card of the computer—as analog audio—and is fed via cables to the keyboard and hence the speakers. Being analog audio, the sound quality is not good. Many such keyboards have complex additional functional controls, plural connections to the host computer, and have in-built sound functionality in addition to those of the host computer. They may also require additional power inputs.

SUMMARY OF THE INVENTION

In accordance with one form of the present invention, there is provided an alphanumeric keyboard for use with a host computer, the alphanumeric keyboard including a plurality of alphanumeric keys, and a sound reproduction system; the sound reproduction system including an audio processor for receiving at least one audio input for providing at least one analog audio output.

There is also a keyboard controller for sensing use of one or more of the plurality of alphanumeric keys. Keyboard scan code is passed to the host computer. The keyboard controller enables the use of predetermined keys of the alphanumeric keys for providing user input to the control of the operational functions of the data processor. All or some of the keys of the alphanumeric keys may be the predetermined keys.

There may also be included an analog/digital converter for converting analog audio to digital audio. There may also be at least one input of analog audio. The at least one audio input may include at least one digital audio input.

The control of the operational functions may be one or more of: volume up, volume down, mute on, mute off, audio effects including spatialisation and special effects, upmix, downmix, and tone control functions.

The keyboard may include a cable for connection to the host computer. The cable may have at least one digital data connector for connection with a digital data port of the host computer for providing a first of the at least one digital audio input to the keyboard, and for providing the passing of keyboard scan code to the host computer. The digital data connector maybe USB, IEEE 1394, or any other data bus protocol, networking protocol, or wireless protocol. Power for a speaker driver may be through a digital data connector for the host computer. Furthermore, power for the digital amplifier may be through the digital data connector for the host computer.

The analog audio output may be to one or more of: built-in speakers, line out connectors, and headphone connector.

There may be a plurality of digital audio inputs, including a multi-channel digital audio input/output connection, and a MIDI input/output. There may be a plurality of MIDI UARTs, including input and output connectors for connecting MIDI devices.

The alphanumeric keyboard may include an integrated musical keyboard having an output connected to the MIDI input/output.

The data processor has a plurality of output connections for connection to one or more of the digital/analog converter, the analog/digital converter, the multi-channel digital audio input/output, the MIDI input/output, the plurality of MIDI UARTs, and the host computer.

In another aspect, the present invention provides an alphanumeric keyboard for use with a host computer, the alphanumeric keyboard including:
  (a) a plurality of alphanumeric keys;
  (b) a sound reproducing system including an audio processor for receiving at least one of a plurality of audio inputs and for providing at least one analog audio output;
  (c) a keyboard controller for sensing use of one or more of the plurality of alphanumeric keys and passing keyboard scan code to the host computer, the keyboard controller further enabling the use of predetermined keys of the plurality of alphanumeric keys for providing user input to the control of the operational functions;
  (d) a connection to the host computer for providing a first of the plurality of digital audio inputs;
  (e) a multi-channel digital audio input/output connection; and
  (f) a MIDI input/output connection.

In both aspects, the predetermined keys may be remapped to the data processor.

In a further aspect the present invention provides an alphanumeric keyboard for use with a host computer, the alphanumeric keyboard including a plurality of alphanumeric keys, and a sound reproducing system; the sound reproducing system including:
  (a) a data processor for controlling operational functions of the sound reproducing system;

(b) an audio processor for receiving at least one digital audio input and for providing at least one analog audio output;

and wherein there is further provided a cable for connection of the alphanumeric keyboard to the host computer, the cable having a single digital data connector for connection with a digital data port of the host computer for providing a first input of the at least one digital audio input to the keyboard.

For all aspects, the audio input to the audio processor may be analog or digital. The audio processor may be one or more of an analog amplifier, a digital amplifier and a digital/analog converter. The at least one digital input may be directly into the audio processor. There may included a data processor for receiving and processing the at least one input before sending the at least one input to the audio processor. The data processor may also being for controlling operational functions of the sound reproduction system. The data processor may be in the host or the alphanumeric keyboard. The analog audio input may include at least one microphone built-in to the alphanumeric keyboard.

DESCRIPTION OF THE DRAWINGS

In order that the invention may be readily understood and put into practical effect, there shall now be described by way of non-limitative example only a preferred embodiment of the present invention, the description being with reference to the accompanying illustrative drawings in which.

DESCRIPTION OF THE PREFERRED EMBODIMENT

Figure 1:
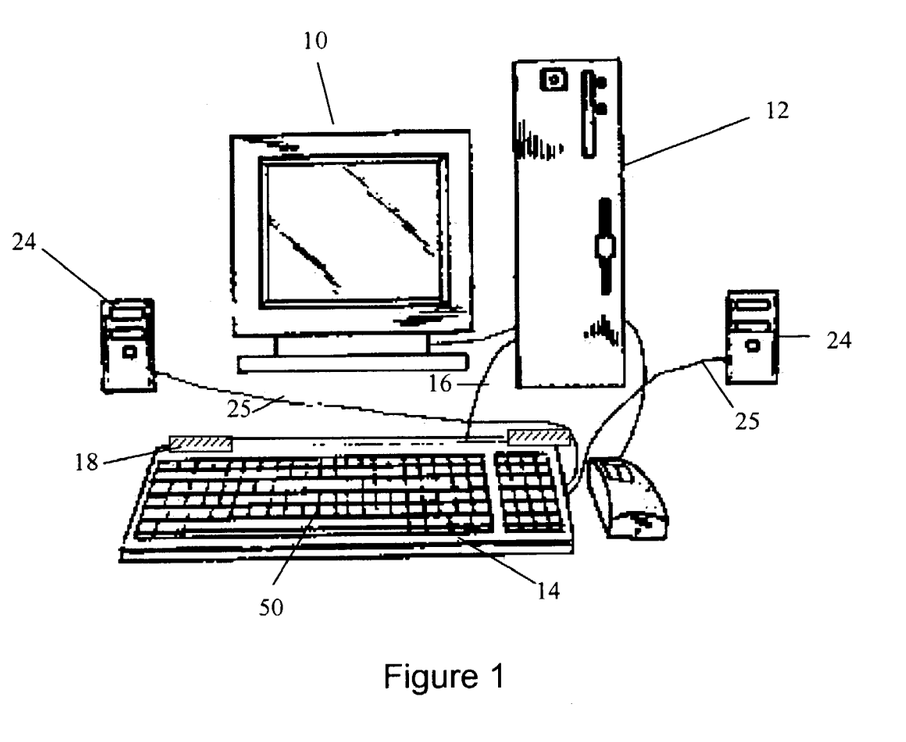
FIG. 1 is a schematic illustration of a computer system using the present invention.
Figure 2:
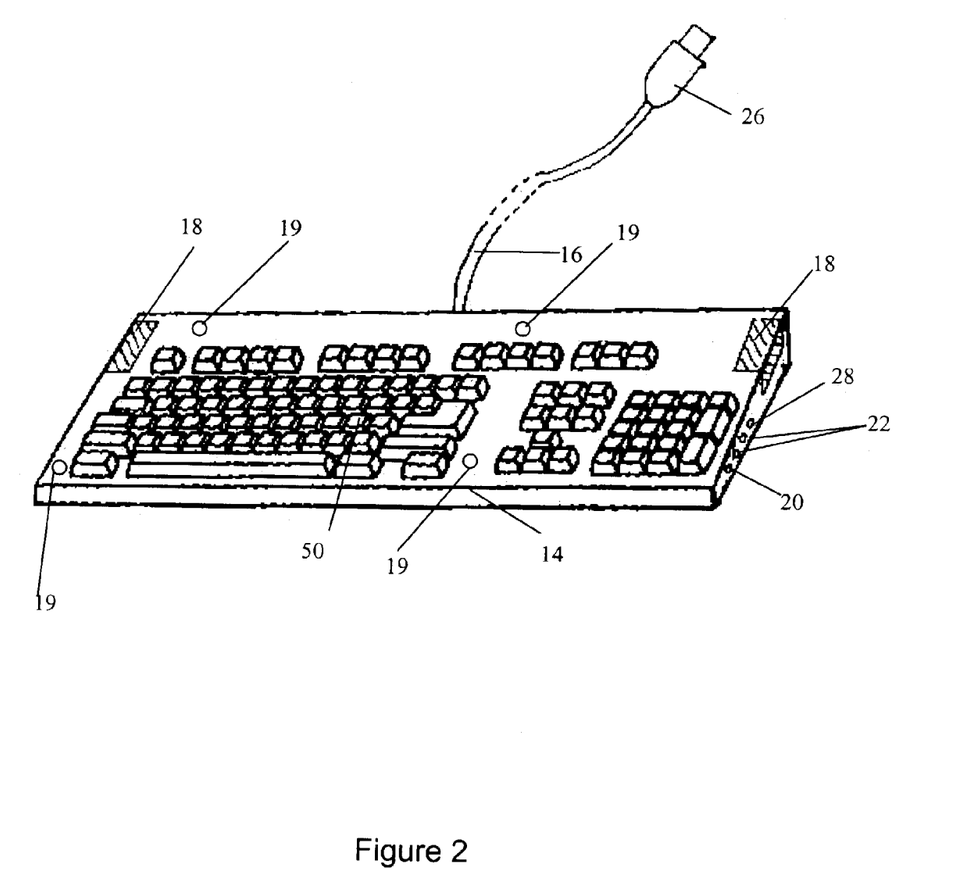
FIG. 2 is a schematic illustration of keyboard of FIG. 1.

To first refer to FIGS. 1 and 2, there is shown a computer system including monitor 10, host PC 12 and keyboard 14. Keyboard 14 is shown connected to host PC 12 by a cable 16. Alternatively, a wireless connection may be used. The wireless connection may be by any suitable system including, for example, Bluetooth, or any other radio frequency or infrared system.

Keyboard 14 has built-in speakers 18 and a headphone jack connector 20. It may have one, two or more female connectors 22 to enable connection of satellite speakers 24 using speaker cables 25, if desired. Connectors 22 may be for standard RCA plugs, pins, wire connection, or otherwise as desired. If satellite speakers 24 are connected, built-in speakers 18 may be automatically disconnected. A standard DIN socket 28 for a MIDI connector may also be provided. In this way keyboard 14 becomes an audio connector hub.

Cable 16 is connected to keyboard 14 at one end, and has its other end at least one digital data connector 26. It is preferred to be only one connector 26. The connector 26 may be a USB connector or a IEEE 1394 connector, or other suitable digital data transfer connector. In the following description reference will be made to the use of a single USB connector for the sake of convenience. However, there may be two connectors 26 with one connector 26 being for "normal" keyboard functions, and a second connector 26 being for digital audio transfer.

Figure 3:
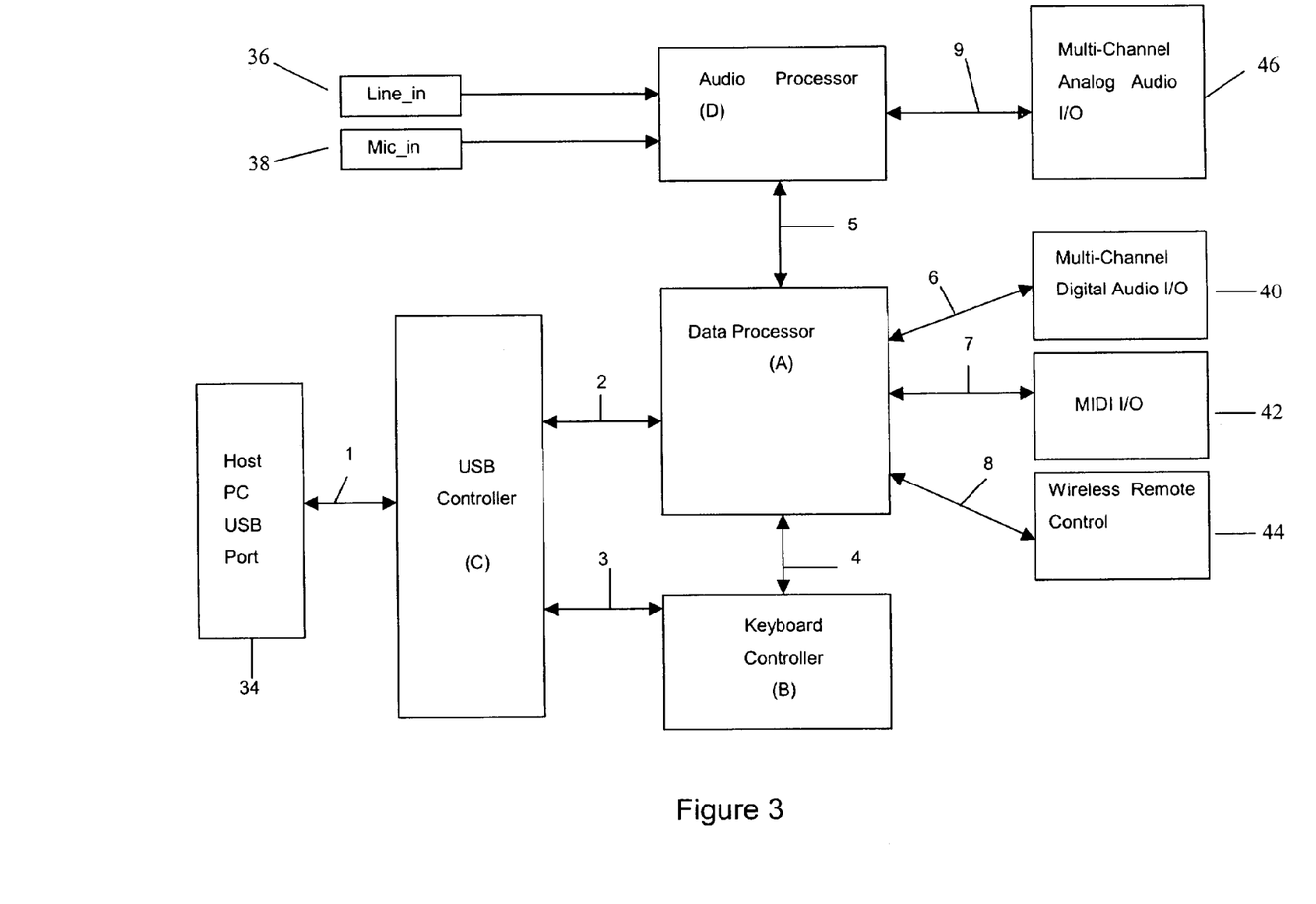
FIG. 3 is a block diagram showing the data flow between the various components on the keyboard.

Upon connector 26 being connected into a digital data port on host PC 12, the host PC 12 system detects the presence of two devices. If connector 26 is a USB connector it will detect a USB digital audio device, and a USB keyboard 14—through USB controller C and line 1 (FIG. 3).

Keyboard 14 has a keyboard controller B that, insofar as the normal operation of the alphanumeric keys 50 is concerned, operates in the usual manner. Keyboard controller B communicates with USB controller C (and thus host PC 12) over line 3, and with a data processor A in keyboard 14 over line 4, or via host PC 12. In this way, standard keys 50 on keyboard 14 can be used for controlling the function of data processor A. Extra keys, volume controls, mute function buttons, and so forth, may not be required to control the audio functions.

Digital audio from host PC 12 is received via USB connector 26, USB controller C, and line 2 into data processor A. The digital audio data may be in any compressed or uncompressed format such as, for example, WAV, MP3, PCM, AAC, AC3, WMA and THX, and it may also be raw digital data. If necessary, data processor A conducts any necessary processing to convert the digital audio into raw digital audio suitable for digital to analog conversion. The raw digital data is then passed to audio processor D over line 5 where it is converted to analog and output over line 9 as analog audio through multi-channel analog audio input/output 46. This may be multi-channel analog audio. If the digital audio from host PC 12 is, for example, compressed, the decompression would also take place in data processor A, the data processor A thereby acting as a compressor/decompressor. Audio processor D may be one or more of an analog amplifier, a digital amplifier, an analog/digital converter, and a digital/analog converter.

From line 9 and output 46, the analog audio can be played over built-in speakers 18, headphones connected to plug 20, or satellite speakers 24, or two or more of them. If the audio processor D is an amplifier, either digital or analog, it may be used to power the built-in speakers 18, headphone via plug 20, or satellite speakers 24 by using power from host 12 obtained through the USB port. This means no additional power connection, power adapter, or the like, is required. This will provide up to a normal listening volume. If the satellite speakers 24 require a higher power level of signal, or if a higher volume level is required, an additional power input may be required. When audio processor D includes a digital amplifier, it may operate in "normal" mode by receiving an analog input from host 12 that becomes either a positive or negative voltage after passing through a comparator. However, it may eliminate the comparator so that the high and low levels may be obtained directly from data processor A. The audio input 5 to the audio processor D may be analog or digital.

If the audio input 5 is digital, and audio processor D is a digital amplifier, the digital audio input 5 may be direct into audio processor D from host 12 via the USB port and driver. In this case, the data processor A may be on host 12. This may also apply if audio processor D is a digital/audio converter.

Figure 4:
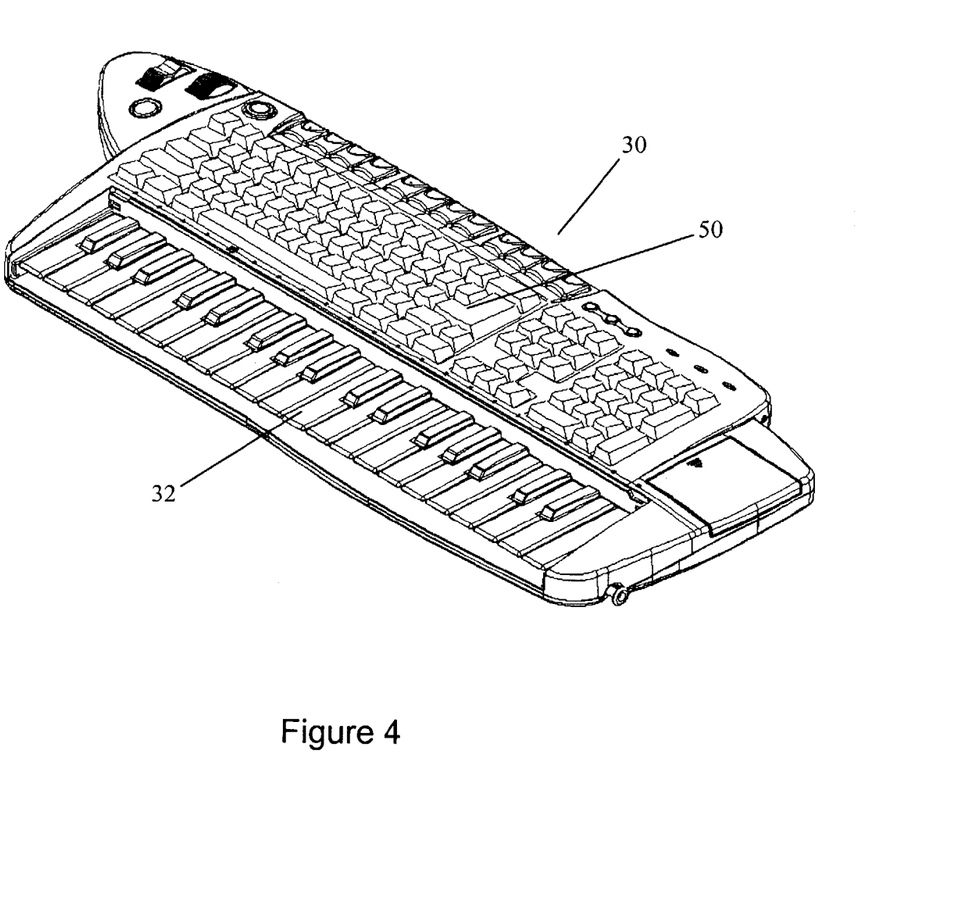
FIG. 4 is a schematic illustration of the keyboard of FIG. 2 with an integrated music keyboard.

Any other form of multi-channel digital audio may be input into keyboard 14 through the appropriate MIDI DIN connector 28 and MIDI input/output interface 42. A MIDI input will be MIDI data that is converted by the data processor A to digital audio data. It may also be input from an in-built source such as that shown in FIG. 4—a keyboard 30 having a musical keyboard 32 built-in and integrated with the alphanumeric keyboard 14. This may be in accordance with our earlier application number PCT/SG01/00040, the contents of which are hereby incorporated by reference. Although MIDI is used, it may also be used for a quasi-MIDI musical keyboard, or any other musical keyboard, or any other musical keyboard operating system.

A further input is shown on FIG. 3 as multi-channel digital audio input/output 40. Both digital audio 40 and MIDI 42 inputs/outputs are to/from data processor A over lines 6 and 7 respectively. From there, inputs can be passed to audio processor D, to host 12, or to both of them. The signal input from MIDI input 42 may also be MIDI synthesised and output through multi-channel digital audio input/output 40, multi-channel analog audio output 46, or both of them, or to host 12 as MIDI data or audio data. It may also be output through MIDI input/output 42.

On host 12 will be installed a known USB driver such as, for example, that built in to the various "WINDOWS" operating systems as supplied by Microsoft Corp. The USB driver enables a multimedia application such as, for examples, "WINDOWS MEDIA PLAYER" OR "REAL PLAYER" on host 12 to direct control or interface with the processor A. The audio drivers maybe a driver such as, for example, the "SOUND BLASTER" "EXTIGY" as available from Creative Technology Limited, of Singapore.

The audio processor D may also receive analog audio input from, for example, either or both of a line input 36 and a microphone input 38. The microphone input 38 may from one or more built-in microphones 19. The audio processor D will process the analog audio, covert it to digital audio, and pass the digital audio to data processor A over line 5. It can then be passed to host 12 through controller C and line 2, to digital audio in/out 40 over line 6, or to both of them.

After digital audio data is processed by data processor A and audio processor D, it may be output directly as, for example, Sony/Phillips Digital Interface (S/PDIF), I²S, or as optical audio through line 2, USB controller C, line 1, and USB connector 26 and port 34, to host 12. Digital audio output may, for example, be used to provide an input to digital speakers, or a home theatre receiver, or to save audio as a file on the host 12.

The data processor A, as mentioned above, is able to be the subject of user input to control the processing of all audio inputs (digital and analog). This may be by the use of keyboard 14 and keyboard controller B. In this way, normal alphanumeric keys 50 of keyboard 14 can be used to control functions performed by data processor A. The functions performed by data processor A able to be controlled using keyboard controller B include, but are not limited to:

| | |
|---|---|
| volume up | special effects |
| volume down | upmix |
| mute on | downmix |
| mute off | tone control functions |
| spatialisation | audio effects |

Special effects may include, for example, reverberation echo, equalisation, distortion effects, sound effects, and so forth.

Figure 5:
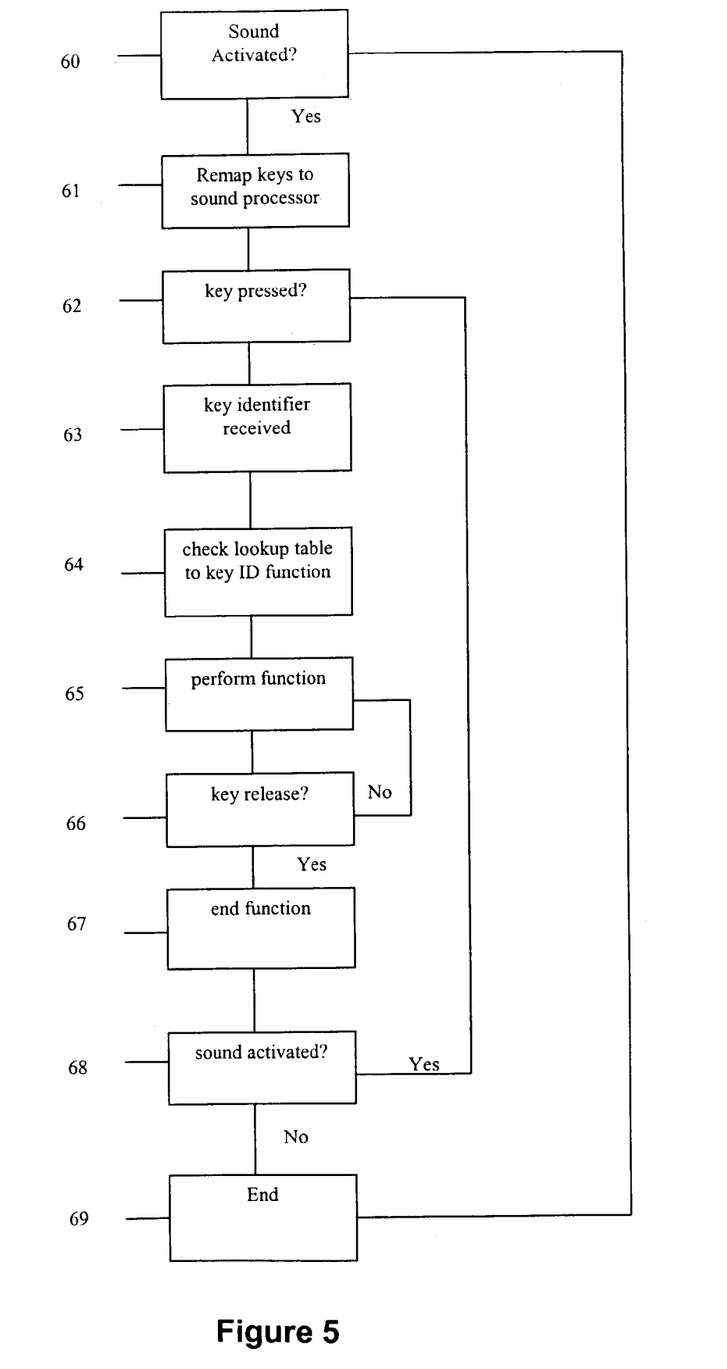
FIG. 5 is a flow chart of interaction between the keyboard controller and processor of FIG. 3.

As is shown in FIG. 5, there may be a requirement for the sound function in keyboard 14 to be activated. Alternatively or additionally, there may be a requirement for the use of keys 50 to control data processor A to be activated. This may be by use of one or more of: a special key, a function key, and a specific combination of two or more keys of keys 50 at the one time. For example, the use of "Ctrl+Alt+Delete" for the usual reboot instruction. Any such keys may be on a separate keypad or remote control device. As the host 12 will recognise signals from such keys in the same manner as if they were from the keyboard 14, and as they are in the same class of signals as those from the keyboard 14, they have the same effect as if they were from the keyboard 14. The connection to host by such a separate keypad may be by any radio frequency or infrared connection, or by cable.

Upon activation at 60, if "yes" the keys 50 are remapped at 61 to data processor A. As each of the keys 50 has a unique identifier within keyboard controller B, data processor A can then accept those identifiers and allocate to each identifier a specific sound function. The relationship between each key 50 identifier and the respective sound function may be contained in a look-up table.

When a key 50 is pressed at 62, data processor A receive the identifier for the key 50 at 63, checks the lookup table at 64 to determine the function allocated to that identifier, then performs the function. While the key 50 is pressed, the data processor A will continue to perform that function. When key 50 is released (66), it ceases that function (67).

Upon the sound functionality/use of keys 50 being deactivated (68), data processor A ends its tasks (69).

Which of the keys 50 are to be remapped is preferably predetermined. However, user input to the selection of keys to be remapped may be permitted to enable user control over the audio function to be controlled. Additionally or alternatively, the user may be able to have input to the audio functions being controlled so that, for example, a user may decide to change an audio sound effect of a particular key from "thunder" to "earthquake".

All or some of keys maybe remapped. This again may be predetermined or be by user input, or by a combination of them.

A wireless remote control 44 may be used to provide operational control signals to data processor A over line 8. Wireless input may be used to control basic functionality, or may include volume, muting, and so forth, according to the list above.

Power for keyboard 14 and all of the processors and controllers may be USB power, power from an external or internal power source, or a combination of them.

The keyboard 14 includes all components and functionality typically found in PC sound card. For purposes of simplicity, all such components and functionality are not found herein, but one of ordinary skill in the art would know to include them. For example, memory (not shown in FIG. 3) is typically provided with the data processor A for storage of digital sounds.

By use of the present invention, it may not be necessary for host PC 12 to have a sound card—all sound processing may be in keyboard 14. Furthermore, all speaker and headphone connections may be built in to or form part of the keyboard 14. This may be useful due to developments in computers such as, for example, tablet computers, notebook computers, personal digital assistants, and so forth. Also, in many offices computers are supplied for staff without sound cards. By using their own keyboard, staff can add sound capabilities without needing to open the case of the office computer.

Whilst there has been described in the foregoing description a preferred embodiment of the present invention, it will be understood by those skilled in the technology concerned that many variations or modifications in details of design, construction and operation may be made without departing from the present invention.

The invention claimed is:

1. An alphanumeric keyboard for use with a host computer, the alphanumeric keyboard comprising:
   a plurality of alphanumeric keys;
   a sound reproduction system, the sound reproduction system including an audio processor for receiving audio input, the audio input including at least one digital audio input, and for providing at least one analog audio output from the audio processor;
   a keyboard controller for sensing use of one or more of the plurality of alphanumeric keys and passing of keyboard scan code to the host computer, and
   a digital data connector for connecting the alphanumeric keyboard with the host computer, the digital data connector providing the keyboard scan code to the computer and receiving at least one digital audio input from the host computer.

2. An alphanumeric keyboard as claimed in claim 1, further comprising a data processor for receiving and processing the audio input before sending the at least one digital audio input to the audio processor.

3. An alphanumeric keyboard as claimed in claim 1, wherein the audio input includes a plurality of digital audio inputs.

4. An alphanumeric keyboard as claimed in claim 1, wherein the audio processor comprises a digital amplifier.

5. An alphanumeric keyboard as claimed in claim 1, wherein the audio processor comprises a digital/analog converter.

6. An alphanumeric keyboard as claimed in claim 4, further comprising an analog/digital converter for converting analog audio to digital audio.

7. An alphanumeric keyboard as claimed in claim 3, wherein the at least one analog audio output is provided to one or more selected from the group consisting of: built-in speakers, line out connectors, and headphone connector.

8. An alphanumeric keyboard as claimed in claim 1, wherein the digital data connector is selected from the group consisting of: USB and IEEE 1394.

9. An alphanumeric keyboard as claimed in claim 4, wherein power for the digital amplifier is provided by the digital data connector.

10. An alphanumeric keyboard as claimed in claim 1, further comprising a multi-channel digital audio input/output connector for providing a plurality of digital audio inputs.

11. An alphanumeric keyboard as claimed in claim 1, further comprising a MIDI input/output connector for providing digital data to be converted to digital audio and to provide a plurality of digital audio inputs.

12. An alphanumeric keyboard as claimed in claim 11, wherein the alphanumeric keyboard includes a musical keyboard integrated with the alphanumeric keyboard, the musical keyboard having an output connected to the MIDI input/output connector.

13. An alphanumeric keyboard as claimed in claim 2, wherein the data processor controls at least one function of the sound reproduction system, and produces at least one output, the output provided to one or more selected from the group consisting of: the audio processor, a multi-channel digital audio input/output connector, a MIDI input/output connector, a plurality of MIDI UARTs, and the host computer.

14. An alphanumeric keyboard as claimed in claim 2, wherein the keyboard controller further enables the use of predetermined keys of the plurality of alphanumeric keys by the user to control at least one function of the data processor.

15. An alphanumeric keyboard as claimed in claim 1 14, wherein the predetermined keys are all keys of the alphanumeric keyboard.

16. An alphanumeric keyboard as claimed in claim 2, wherein the keyboard controller further enables the use of predetermined keys of the plurality of alphanumeric keys by the user to control at least one function of the data processor and wherein the predetermined keys are remapped from the keyboard controller to the data processor.

17. An alphanumeric keyboard for use with a host computer, the alphanumeric keyboard comprising:
   (a) a plurality of alphanumeric keys;
   (b) a sound reproducing system including an audio processor for receiving a plurality of audio inputs, the plurality of audio inputs comprising at least one digital audio input, and providing at least one analog audio output;
   (c) a keyboard controller for sensing use of one or more of the plurality of alphanumeric keys and passing keyboard scan code to the host computer;
   (d) a digital data connector for connecting the alphanumeric keyboard with the host computer and for providing the at least one digital audio input from the host computer;
   (e) a multi-channel digital audio connector for providing at least one of the plurality of audio inputs; and
   (f) a MIDI input/output connector for providing digital data to be converted to at least one of the plurality of audio inputs.

18. An alphanumeric keyboard as claimed in claim 17, wherein the digital data connector is selected from the group consisting of: USB and IEEE 1394.

19. An alphanumeric keyboard as claimed in claim 17, further comprising a data processor for receiving and processing the plurality of audio inputs before sending the plurality of audio inputs to the audio processor.

20. An alphanumeric keyboard as claimed in claim 19, wherein the keyboard controller further enables the use of predetermined keys of the plurality of alphanumeric keys by the user to control at least one function of the data processor.

21. An alphanumeric keyboard as claimed in claim 14, wherein the control of the at least one functions is selected from the group consisting of volume up, volume down, mute on, mute off, audio effects including spatialisation and special effects, upmix, downmix, and tone control functions.

22. An alphanumeric keyboard as claimed in claim 17, wherein the plurality of audio inputs comprises a plurality of digital audio inputs.

23. An alphanumeric keyboard as claimed in claim 17, wherein the audio processor comprises a digital amplifier.

24. An alphanumeric keyboard as claimed in claim 17, wherein the audio processor comprises a digital/analog converter.

25. An alphanumeric keyboard as claimed in claim 24, further comprising an analog/digital converter for converting analog audio to digital audio.

26. An alphanumeric keyboard as claimed in claim 20, wherein the control of the operating functions is selected from the group consisting of volume up, volume down, mute on, mute off, audio effects including spatialisation and special effects, upmix, downmix, and tone control functions.

27. An alphanumeric keyboard as claimed in claim 17, wherein the at least one analog audio output is provided to one or more selected from the group consisting of: built-in speakers, line out connectors, and headphone connector.

28. An alphanumeric keyboard as claimed in claim 22, wherein the alphanumeric keyboard is connectable to the host computer by a cable, the cable including the digital data connector for connection with a digital data port of the host computer.

29. An alphanumeric keyboard as claimed in claim 19, wherein the keyboard controller further enables the use of predetermined keys of the plurality of alphanumeric keys by the user to control at least one function of the data processor and wherein the predetermined keys are remapped to the data processor.

30. An alphanumeric keyboard as claimed in claim 23, wherein power for the digital amplifier is obtainable through the digital data connector.

31. An alphanumeric keyboard as claimed in claim 23, wherein the sound reproduction system includes a speaker driver, power for the speaker driver being obtainable through the digital data connector.

32. An alphanumeric keyboard for use with a host computer, the alphanumeric keyboard including a plurality of alphanumeric keys and a sound reproducing system, the sound reproducing system comprising:
   (a) a data processor for controlling functions of the sound reproducing system; and
   (b) an audio processor for receiving at least one digital audio input and for providing at least one analog audio output;
   and wherein the sound reproduction system includes a port that is connectable with a cable, the cable for connecting the alphanumeric keyboard to the host computer, the cable having a digital data connector for connection with a digital data port of the host computer for sending scan codes from the keyboard, the digital data connector providing the at least one digital audio input to the keyboard from the host computer.

33. An alphanumeric keyboard as claimed in claim 32, wherein the at least one digital audio input is input directly into the audio processor.

34. An alphanumeric keyboard as claimed in claim 32, wherein the data processor is for receiving at least one analog audio input, the at least one analog audio input including at least one microphone built-in to the alphanumeric keyboard.

* * * * *